United States Patent
Mattern

[11] Patent Number: 5,832,265
[45] Date of Patent: Nov. 3, 1998

[54] REENTRANT LIBRARIES

[75] Inventor: Axel Mattern, Verl, Germany

[73] Assignee: Siemens Nixdorf Informationssysteme Aktiengesellschaft, Paderborn, Germany

[21] Appl. No.: 464,886
[22] PCT Filed: Mar. 22, 1993
[86] PCT No.: PCT/DE93/00256
  § 371 Date: Jun. 27, 1995
  § 102(e) Date: Jun. 27, 1995
[87] PCT Pub. No.: WO94/22080
  PCT Pub. Date: Sep. 29, 1994
[51] Int. Cl.⁶ .................................................. G06F 9/40
[52] U.S. Cl. ........................ 395/685; 395/670; 395/710; 395/186
[58] Field of Search .................................... 395/710, 677, 395/670, 680, 186, 703, 712, 685

[56] References Cited

U.S. PATENT DOCUMENTS

| 4,677,546 | 6/1987 | Freeman et al. | 364/200 |
| 5,414,854 | 5/1995 | Heninger et al. | 395/200 |
| 5,455,949 | 10/1995 | Conder et al. | 395/700 |
| 5,481,706 | 1/1996 | Peek | 395/650 |
| 5,542,045 | 7/1996 | Levine | 395/186 |

FOREIGN PATENT DOCUMENTS 0416768  3/1991  European Pat. Off. .

OTHER PUBLICATIONS

IBM Technical Disclosure Bulletin, vol. 34, No. 4B, Sep. 1991, "Semaphore Architecture for Multi–Threaded Multi–Masking Operating Systems", pp. 246–257.

Primary Examiner—Emanuel T. Voeltz
Assistant Examiner—Michael T. Richey
Attorney, Agent, or Firm—Hill & Simpson

[57] ABSTRACT

A protective mutex switch is used in data processing installations for control of execution paths within processes. Library subroutines are protected by shell subroutines with the original name and thereby, establish the synchronization of processes using the libraries.

5 Claims, 1 Drawing Sheet

REENTRANT LIBRARIES

This application is a 371 of PCT/DE93/00256 filed Mar. 22, 1993.

BACKGROUND OF THE INVENTION

1. Field of the Invention

The method relates to the operation of computer installations having a number of processors and a joint memory.

2. Description of the Related Art

To utilize a number of processors with a shared memory, use is made of operating systems which can process a number of logical tasks simultaneously by providing a process control. In a known process control, the processes are largely isolated, thus in particular they use separate memory areas, assigned by the operating system. However, the degree of parallel work which can be achieved in this way is not adequate in practice. Either there are not an adequate number of processes ready for execution at the same time, meaning that processors are not utilized. Or, if the programs are divided further into processes, the benefit brought by parallel work is offset by the effort required for switching over and coordination of the processes. Therefore, an additional parallel control has been introduced, which is referred to as "threads" and allows a number of parallel execution paths within a process, these execution paths sharing all global variables and the program code. A description is given in chapter 6 ("Programming with Threads") of the DCE Application Development Guide of the Open Software Foundation, Cambridge, USA, 1991.

The coordination of these execution paths is a task for the user, who uses for this a functional block of the thread components. This is a mechanism which is known as a semaphore and, in conjunction with threads, is referred to as a mutex. A mutex is a switch having an ON and an OFF state, to which a number of execution paths have access. A setting, i.e. switching over to the ON state, leads to a waiting state, if the switch is already in the ON state. The waiting state lasts until another execution path cancels the mutex again, i.e. the switch is brought back into the OFF state. Consequently, the protection of a program part which uses only a single operating means is possible. For this purpose, the mutex is set upon entry into this program part. It is consequently ensured that no other execution path uses this program part at the same time. At the end, the mutex is cancelled and consequently any waiting execution paths are given the possibility of then using the operating means exclusively.

If a threads component is subsequently added, the library subroutines made available to the user program and defined, for example, for the operating system UNIX in the System V Interface Definition are no longer compatible with the threads component. Therefore, shell subroutines are prepared under a new name, although the new name is similar to the old name for a human reader, and, before calling up the original library subroutine, these shell subroutines use a mutex in order to serialize these calls. This means, however, that the source code of the user program has to be altered, because the library subroutines have to be called up under a new name.

In addition, software producers are also supplying subsystems which are delivered in the form of subroutine libraries which for their part use the library subroutines of the operating system and are connected by a linking operation both to the user program and to the library subroutines.

SUMMARY OF THE INVENTION

The invention allows the original names to be retained and, nevertheless, the library subroutines to be serialized by mutex calls.

For this purpose, first of all, in a preparatory step, the library subroutines are investigated to ascertain whether they are compatible with threads. Incompatibility exists, for example, in the case of sequential file operations, because the operating system maintains a write and read pointer for each process and each file, but not for each thread. Included here are also the functions organized similarly to a file access for the receiving of messages or the acceptance of interrupt signals. Another case is when the result is provided in a static area of a subroutine and remains valid only until the next call; here, the next thread could overwrite the data which the previous thread has not finished evaluating. Both the file operations and the static areas are resources in the broad sense.

These incompatibilities which are thus determined serve for classifying the subroutines, subroutines from different classes being defined as those not having any joint thread-incompatible operating means. Consequently, each class can be assigned a dedicated inhibiting or exclusive means (MUTEX). This achieves a protective effect which is specific enough to achieve in the following step the effect that the user program then only uses protected library functions. If, specifically, only a single exclusive means is defined, the distributing effect of the threads over a number of processors is cancelled, because often only one thread is active and is waiting, for example, for a message. All the other threads then run only up until the time at which they call up a library subroutine.

After the preparations, now a protected copy of the library concerned can be produced. For this purpose, first, all the subroutines concerned are renamed, preferably to a name derived from the original name by a prefix such as "O_". Thus "date" becomes "O_date". This operation may be performed either on the sources of the library subroutines or by a program which modifies the library and the objects stored therein. Subsequently, the library is supplemented by shell subroutines. These first of all provide the original name (in the example "date") and for their part call up the original library subroutine under the new name (in the example "O_date"). In addition, before this call, a MUTEX is set via the threads component and is cancelled after this call.

The library which is thus created can be used instead of the original one by the user, who has a user program in the object format, and is nevertheless threads-compatible without any further measures. This necessity arises, as already mentioned, if on the one hand the user program uses subroutine libraries without having sources for them, but these for their part use the system libraries, such as in the case of a database component. Without the solution specified, the user program could not use the threads component.

An example of a main program, reduced to the maximum, reads as follows:

```
main( )
{
    char * date( );
    char * result;
    int year;
    result = date( );
    sscanf(result, "%d", &year);
    printf("Year=19%d/n", year);
}
```

The corresponding shell procedure reads as follows:

```
char * date( )
{
    mutex date_mutex;
    char * temp;
    mutex_on(date_mutex);
    temp = O_date( );
    mutex_off(date_mutex);
    return temp;
}
```

DETAILED DESCRIPTION OF THE PREFERRED EMBODIMENTS

Figure 1:
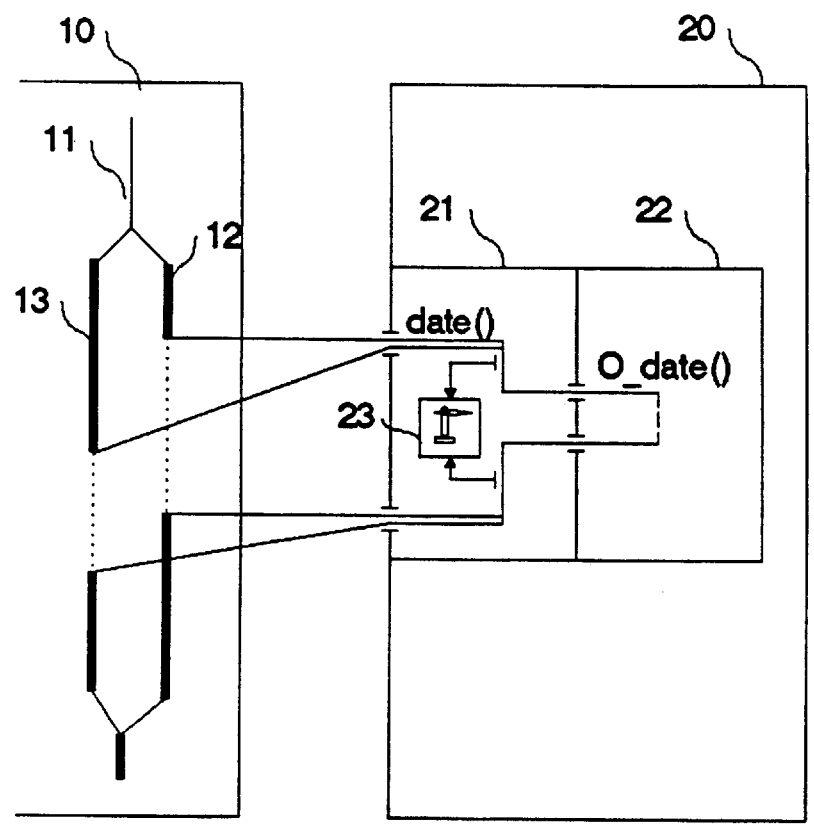
FIG. 1 is a schematic illustration of a main program call of a subroutine by two threads.

The result is shown graphically in FIG. 1: a main program 10 uses the library 20. The control flow 11 is split into the two threads 12 and 13, which call up the subroutine "date()" at different times. By the linking operation, the shell subroutine 21 is consequently called up, first of all setting the mutex 23 and then calling up the original subroutine 22 by the call of "O_date()". After returning from this, the mutex 23 is cancelled and control returns to the thread 12 or 13 which was left.

Although other modifications and changes may be suggested by those skilled in the art, it is the intention of the inventor to embody within the patent warranted hereon all changes and modifications as reasonably and properly come within the scope of his contribution to the art.

I claim:

1. A protective method for subroutines in a data processing system having at least one processor and a control for a plurality of execution paths within a process running upon execution of a program, comprising the steps of:

providing an exclusive means for serializing subroutines for said number of execution paths;

providing a root part of said program code which is specific to a task of the program and which is not altered by the protective method and which uses library subroutines marked by original names as predetermined identifiers;

at least one of the library subroutines marked by said predetermined identifiers using an operation of a type that is incompatible with execution by a plurality of execution paths;

providing a library which contains said at least one incompatible library subroutine to be protected;

altering a name of said at least one subroutine to be protected from an original name to an altered name;

for each library subroutine to be protected, providing a shell subroutine which has the original name used by the root part;

using the exclusive means for serializing execution paths to provide an exclusive execution path of said at least one subroutine; and using said shell subroutine of said original name to call up said at least one subroutine to be protected using said altered name to enact a function of said at least one subroutine to be protected.

2. A protective method as claimed in claim 1, further comprising the steps of:

classifying the library subroutines to be protected according to operating means used which are incompatible with execution by a plurality of execution paths;

dividing the library subroutines into classes each having pairs of different operating means of this type; and assigning to each class a dedicated exclusive means for use by the shell subroutines.

3. A method for protecting a plurality of execution paths running during execution of a program in a computer, comprising the steps of:

providing a library of subroutines which are called by the plurality of execution paths, said library of subroutines including at least one subroutine which is incompatible with parallel execution by said plurality of execution paths;

providing an exclusive control means for serializing the plurality of execution paths;

renaming said at least one subroutine from an original name to a different name;

providing a shell subroutine having a same name as said original name of said at least one subroutine, said shell subroutine when called by said program performing the steps of:

setting said exclusive control means to exclude subsequent calls, running said at least one subroutine under said different name, and resetting said exclusive control means to a non-exclusive setting after execution of said at least one subroutine so that said program executes said at least one subroutine of said different name exclusively by calling said shell subroutine of said original name.

4. A method as claimed in claim 3, further comprising the steps of:

determining which subroutines of said library of subroutines are incompatible with parallel execution by said plurality of execution paths;

classifying said plurality of subroutines in said library of subroutines according to compatibility with parallel execution by said plurality of execution paths; and assigning each class of subroutines to an exclusive control means so that subroutines of each class may be executed in parallel by said plurality of execution paths.

5. A method for protected execution of subroutines in parallel processing, comprising the steps of:

providing a calling program code including calls to subroutines of a subroutine library;

determining which subroutines of said subroutine library are incompatible with parallel execution;

providing an exclusive control means for serializing the plurality of execution paths for said subroutines which are determined to be incompatible with parallel execution;

renaming said subroutines which are determined to be incompatible with parallel execution to altered subroutine names;

providing a shell subroutine for each of said subroutines which are determined to be incompatible with parallel execution, said shell subroutines being named a same name as an original name of a corresponding one of said subroutines which are determined to be incompatible with parallel execution, each of said shell subroutines performing the steps of:

setting said exclusive control means for exclusive operation, calling said corresponding one of said subroutines for execution by calling said altered subroutine names, returning said exclusive control means for non-exclusive operation upon completion of said execution of said corresponding one of said subroutines; and executing said calling program code for parallel processing so that said shell subroutines are executed when said original names of said subroutines which are determined to be incompatible with parallel execution are called, wherein said shell subroutines call corresponding ones of said original subroutines using said altered subroutine names.

\* \* \* \* \*